Aug. 19, 1930.  C. A. WARDEN  1,773,415
COAL LOADING CONVEYER
Filed Jan. 17, 1928
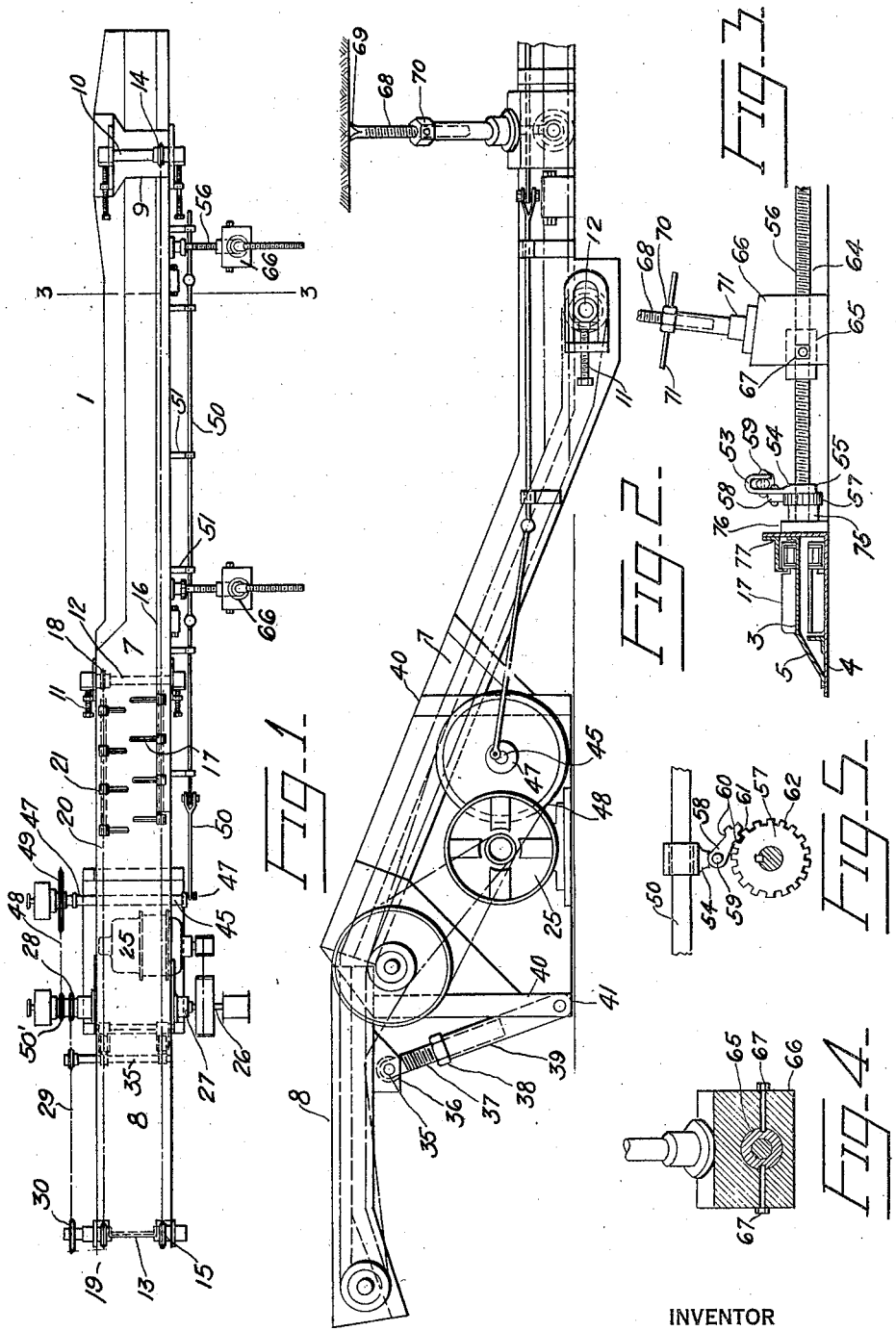
INVENTOR
CHARLES A. WARDEN
BY
ATTORNEY Patented Aug. 19, 1930

1,773,415

UNITED STATES PATENT OFFICE

CHARLES A. WARDEN, OF HEMPHILL, WEST VIRGINIA, ASSIGNOR TO KINGSTON-POCAHONTAS COAL COMPANY, OF NEW YORK, N. Y., A CORPORATION OF WEST VIRGINIA

COAL-LOADING CONVEYER

Application filed January 17, 1928. Serial No. 247,321.

This invention relates to conveyers and more particularly to an apparatus designed to facilitate the transference of loose coal in a mine to the cars in which it is transported from the mine.

It is an object of this invention to provide a conveyer having a loading end, as for example conveyers such as disclosed in my copending applications Serial No. 111,594 filed May 25, 1926, and Serial No. 247,322, filed January 17, 1928, with automatic mechanism for gradually moving the loading end under the pile of coal to be transported, as distinguished from manual means, as for example the jacks shown and described in my copending applications above mentioned.

Other objects and advantages will be apparent from the following detailed description taken in connection with the accompanying drawing in which Fig. 1 is a plan view of the conveyer, the conveyer chains being partly broken away for the sake of clearness, and illustrates a preferred embodiment of this invention; Fig. 2 is a fragmentary side elevation on an enlarged scale showing the power actuated mechanism for driving the conveyer chains and for moving the loading end of the conveyer; Fig. 3 is a sectional view partly in elevation, taken on the line 3—3 of Fig. 1; Fig. 4 is a sectional view through one of the jack blocks, the bearing support and rod therefor being shown in elevation; and Fig. 5 is a fragmentary detail showing a pawl and ratchet for rotating the screw threaded rods to move the loading end of the conveyer.

Referring to the drawing, there is shown a conveyer of the type disclosed in my copending application Serial No. 247,322, filed January 17, 1928, in which 1 indicates the loading end of a conveyer comprising top and bottom plates 3, 4, top plate 3 having a sloping face 5 cooperating with the bottom plate 4 to form a wedge-shaped surface facilitating the introduction of the loading end of the conveyer under the pile of coal to be transported. The conveyer is preferably constructed in sections, has an upwardly extending inclined plate portion 7 and a boom conveyer section 8 pivotally connected to the inclined plate portion 7. A take-up device 9 having shaft 10 mounted therein is positioned at the loading end of the conveyer, a take-up device 11 having a shaft 12 mounted therein is positioned at the base of the inclined portion 7 of the conveyer, and a shaft 13 is journaled at the end of the boom conveyer section 8. A sprocket wheel 14 is mounted on shaft 10, a sprocket wheel 15 is mounted on shaft 13 and a chain 16 having a plurality of flights 17 secured at intervals thereto, passes over sprockets 14 and 15. A sprocket wheel 18 is mounted on shaft 12, a sprocket wheel 19 is mounted on shaft 13 and a chain 20 having a plurality of flights 21, secured thereto at regular intervals and facing the flights 17 on chain 16 passes over sprocket wheels 18 and 19. The chains 16 and 20 are driven from motor 25 through a speed reducer 26 having a shaft 27 which has mounted thereon a sprocket 28. Drive chain 29 passes over sprocket 28 and sprocket 30 on shaft 13, thus rotating shaft 13 and the sprockets 15 and 19 secured thereon which in turn drives the chains 16 and 20.

The boom conveyer section 8 is preferably arranged so that it may be elevated or lowered to discharge the coal at any desired height. To accomplish this result, a rod 35 is mounted in bearing supports 36 secured to the base portion of the boom conveyer section 8. Screw threaded bolts 37 are mounted on rod 35 and extend into threaded engagement with nut members 38 rotatably mounted on sleeves 39 pivoted to the frame support 40 at 41. It is evident that turning of the nuts 38 either clockwise or counterclockwise will raise or lower the threaded bolts or rods 37 and correspondingly elevate or lower the boom conveyer section 8.

A shaft 45 is rotatably mounted in frame 40 and has secured at each end thereof a crank or eccentric 47. Shaft 45 is driven from the speed reducer 26 by drive chain 48 passing over a sprocket 49 keyed or otherwise secured to shaft 45 and a sprocket 50' secured to shaft 27 of the speed reducer 26. Connected to the crank or eccentrics 45 are links 50 which pass through guide supports 51 bolted or otherwise secured to the sides of the conveyer. Links 50 are at spaced intervals riveted or bolted to the U-shaped portions 53 (Fig. 3) of ratchet arms 54 having collar portions 55 rotatably mounted on threaded rods 56. Ratchet wheels 57 are keyed or otherwise secured to rods 56 and are arranged to be engaged by pawls 58 pivoted to ratchet arms 54 by pins 59. Pawls 58 are loosely pivoted on pins 59 and are provided with a cam shaped portion 60 and a substantially right angle or operative portion 61. The operative portion 61 is shown (Fig. 5) in engagement with teeth 62 of ratchet wheel 57 and upon the forward stroke of link 50 the pawl 58 is moved to intermittently rotate the ratchet and correspondingly move rods 56. Upon the return stroke the cam shaped portion 60 engages teeth 62 of ratchet 57 sliding idly thereover so that the ratchet is not rotated.

End 64 of threaded rods 56 passes through nuts 65 held in fixed position in jack blocks 66 by lock pins or bolts 67 which pass through the sides of the block 66 and into the walls of the nuts 65. Blocks 66 are secured by jacks comprising threaded rods 68 having teeth or wedge members 69 arranged to engage the roof of the mine and nut members 70 in threaded engagement with rods 68 and positioned in bearing blocks 71 resting on or secured to the jack blocks 66. Nut members 70 are provided with handles 71 and may be turned thereby to cause a clamping action to be exerted on jack blocks 66 thus holding the blocks in fixed position. The other end of rod 56 engages bearing block 75 which has a collar 76 bolted or otherwise secured to the side 77 of the conveyer.

In operation, rotation of shaft 45 imparts rotary movement to eccentrics 47 thereby reciprocating links 50. During the forward stroke of links 50 the pawls 58 engage teeth 62 of ratchet wheels 57 turning the ratchets and the threaded rods 56 which move forward exerting a thrust through bearing blocks 75 on the sides 77 of the loading end of the conveyer, forcing the conveyer under the pile of coal to be transported. Upon the return stroke of links 50, the cam portions 60 of the pawls engage the teeth 62 of the ratchet wheel 57 and slide idly thereover so that no movement is imparted to rods 56. Thus the screw threaded rods are intermittently actuated to move the loading end of the conveyer laterally under the coal pile.

It if is desired to remove the conveyer from beneath the coal pile or more the conveyer in a reverse direction from that described above, the pawls 58 are pivoted about pins 59 so that the teeth 62 on the left hand side of the ratchet wheels 57 (Fig. 5) are engaged by the operative portion 61 of the pawls 58, thereby moving the ratchets 57 upon actuation by links 50 in a reverse direction to correspondingly actuate the threaded rod 56 and move the loading end of the conveyer from beneath the pile of coal.

When the conveyer is placed parallel to the pile of coal to be removed and it is desired to advance all portions of the longitudinal edge of the conveyer the same distance, the threaded bars 63 are all of the same screw pitch so that the loading end is advanced uniformly. If it is desired to advance one portion of the conveyer a distance greater than the adjacent portion, threaded rods of greater pitch are used at that portion of the conveyer that it is desired to advance the greater distance. By inserting appropriate threaded rods of varying pitches any desired movement of the conveyer may be obtained.

It will be noted that an eccentric 47 is provided at each end of the shaft 45 to provide a power source for the links 50 to actuate these links irrespective of the position of the loading of the conveyer, i. e., to provide a power source for links 50 when the loading end of the conveyer is reversed in the seam permitting removal of coal from either the right or left side of the seam.

While but two screw rods and operating mechanism connected thereto have been shown and described herein, it is understood that any number of rods may be used. The number of rods will of course depend upon the length of the conveyer and the desired movement of the conveyer with respect to the coal pile.

It will, of course, be understood that while a specific embodiment of the invention has been shown and described, various changes in the details thereof may be made by those skilled in the art, and this invention is not to be limited to the structure disclosed but only by the scope of the appended claims.

What I claim is:

1. In a conveyer, the combination of a plate having a longitudnal edge which is adapted to be moved under the material to be transported, a plurality of flights and means connected to the flights and to a source of power to advance the flights longitudinally of said plate, nut members, means for holding said nut members in fixed position, threaded rods in said nut members in operative engagement with said plate, ratchet wheels fixed on said rods, pawls arranged to engage said ratchet wheels and means operative from said source of power to move said pawls to rotate said ratchets and turn said rods to move said longitudinal edge.

2. In a conveyer, the combination of a plate having a longitudinal edge which is adapted to be moved under the material to be transported and having an inclined longitudinally extending plane surface along which said material is adapted to be transported, a material receiving plate in longitudinal alignment with the inclined portion of said plate, a chain having a plurality of flights thereon extending along one side of said plates, a chain having a plurality of flights in cooperative relation with the flights of said first mentioned chain disposed on the opposite side of said plate along the inclined longitudinal plane surface of said plate and along the other side of the material receiving plate, means connected to a source of power and to said chains to move said chains longitudinally of said plates, said source of power comprising a shaft, a second shaft in operative relation to said first mentioned shaft, an eccentric on said second mentioned shaft, nut members, threaded rods in said nut members in operative engagement with said plate and means connected to said eccentric and to said threaded rods to rotate said rods and move said longitudinal edge.

In witness whereof, I have hereunto set my hand.

CHARLES A. WARDEN.